Jan. 14, 1964 W. R. PRICE 3,117,795
SPIRAL WOUND GASKET
Filed Aug. 4, 1961
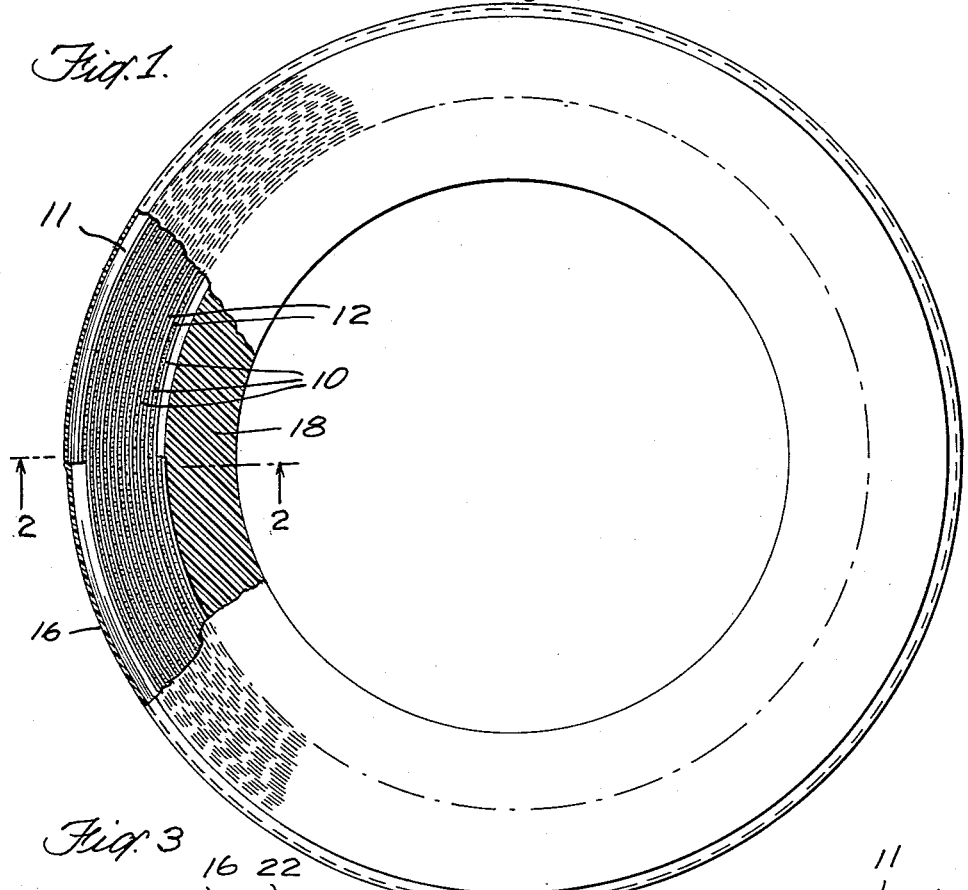
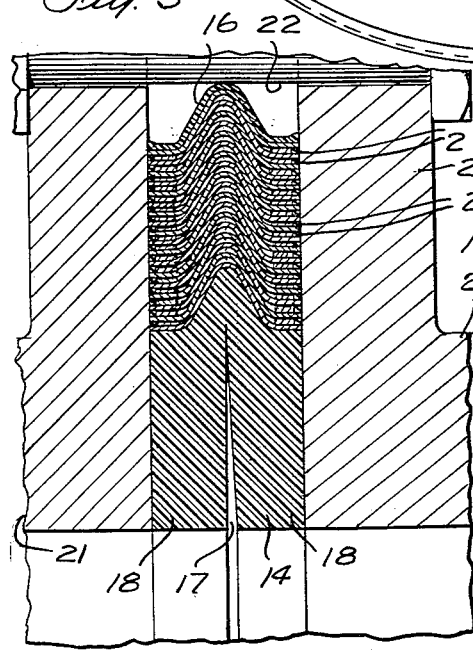
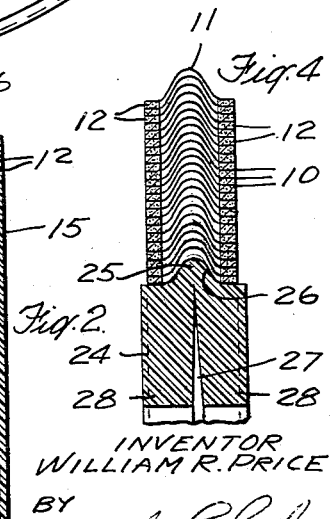
INVENTOR
WILLIAM R. PRICE
BY
ATTORNEY 3,117,795
SPIRAL WOUND GASKET
William R. Price, Wayne, Pa., assignor to Flexitallic
Gasket Company, Camden, N.J., a partnership
Filed Aug. 4, 1961, Ser. No. 129,406
2 Claims. (Cl. 277—198)

This invention relates to spiral wound gaskets and has for an object to provide a gasket of the above type which is corrosion resistant and has improved sealing qualities.

The invention embodies specifically a spiral wound gasket of the type shown in the Bohmer Patent No. 1,829,709 which comprises a spiral wound beaded metal strip having a filler of fibrous material such as asbestos interposed between adjacent convolutions. When such a gasket is used to seal a pipe flange, for example, the inner convolution of the metal strip is exposed to the fluid within the pipe. If the fluid is corrosive to the metal of the gasket it is difficult to maintain a proper seal for any extended period of time. On the other hand an inner protective sealing ring of corrosion resistant material usually fails to maintain a sufficiently tight seal to prevent vapor from contacting the metal of the gasket.

The present invention overcomes these difficulties by producing a sealing ring of corrosion resistant material which covers all exposed surfaces of the metal and is bound thereto in a manner to effect a permanent seal and protection for all metal parts of the gasket.

The invention will be better understood from the following description, taken in connection with the accompanying drawing in which a specific embodiment has been set forth for purposes of illustration.

In the drawing:

FIG. 1 is an elevation of a gasket embodying the invention with parts broken away for clarity;

FIG. 2 is a section taken on the line 2—2 of FIG. 1 but on a much larger scale;

FIG. 3 is a partial sectional showing the gasket in position in a pipe joint; and FIG. 4 is a section of a portion of a gasket illustrating a further embodiment of the invention.

Referring to the drawing more in detail the invention is shown as embodied in a gasket composed of a spiral wound metal strip 10 having a central longitudinal bead 11 and having strips 12 of a filler such as asbestos strips interposed between adjacent convolutions and spirally wound therewith as shown in the Bohmer patent above mentioned. If high corrosion resistance is required the strips 12 may be made of a corrosion resistant material such as Teflon, polytetrafluoroethylene.

The entire gasket is enclosed in an envelope of Teflon comprising an inner sealing ring 14, side films 15 covering the edges of the metal strips and an outer layer 16 covering the outer peripheral surface of the gasket. The inner sealing ring 14 is solid in section except for an annular recess 17 extending from its inner periphery and dividing the ring portion into a pair of flanges 18.

The gasket above described is fully protected from contact with corrosive vapors during shipment, storage and installation by the Teflon envelope. When the gasket is installed between end flanges 20 of a pair of pipe sections 21 as shown in FIG. 3 and held under pressure by bolts 22 the Teflon of the film 15 is forced between adjacent convolutions of the metal strip 10 as indicated at 23 to seal the spaces between such convolutions. The flanges 20 compress the ring portion 14 of the envelope and the fluid pressure within the pipe 21 enters the annular recess 17 and causes the flanges 18 to maintain a tight seal with the surfaces of the flanges 20 thereby preventing the corrosive fluid within the pipes 21 from contacting any portion of the metal strip 10 of the gasket.

The protective envelope above described is preferably formed in one piece by casting the same around the gasket or by dipping or in any other convenient manner. When so formed the sealing ring 14 is securely affixed to the gasket and cannot be removed either in shipment or during use. The ring portion 14 normally prevents any leakage of vapors along the pipe flanges 20. However, in the event of any such leakage the vapors are prevented by the portions 23 of the envelope from coming in contact with any of the side surfaces of the metal strip 10.

The protective envelope has been described as made of Teflon because of the inert properties of this material. Other plastic materials may be used however according to the nature of the fluids with which the gasket is to be used.

In the embodiment of FIG. 4 a spiral wound gasket is shown comprising a metal strip 10 having a longitudinal bead 11 and spirally wound with intervening convolutions of an asbestos strip 12 as in the embodiment above described. A separate inner ring 24 of Teflon is provided with an external bead 25 seating in the inner groove 26 of the spiral wound gasket. The ring 24 is similar to the ring 14 above described and is provided with an inner slot or recess 27 forming opposing flanges 28.

In this form the ring 24 is made somewhat thicker than the spiral wound metal strips 10 so that it is placed under compression when in use. The slot or opening 27 causes the pressure of the internal fluids to hold the flanges 28 in firm pressure engagement with the opposed metal surfaces so as to maintain an effective seal. This embodiment may be useful in instance where the complete enclosure of the metal strips is found to be unnecessary.

What is claimed is:

1. A gasket having corrosion resistant properties comprising a spiral wound metal strip in the form of a plurality of convolutions with a filler of non-metallic material disposed between adjacent convolutions, and a one-piece envelope of molded plastic corrosion-resistant material enclosing said gasket and consisting of an inner sealing ring within the inner periphery of the gasket, and a film disposed over the two sides thereof in a unitary structure, said inner sealing ring having an annular groove extending from the inner periphery thereof to form a pair of flanges terminating at the innermost periphery of said gasket, said flanges adapted to be brought into sealing contact with a sealing surface by reason of fluid pressure exerted from the innermost periphery of said gasket.

2. A gasket as set forth in claim 1 in which said envelope is composed of polytetrafluoroethylene.

References Cited in the file of this patent

UNITED STATES PATENTS

| | | |
|---|---|---|
| 2,257,334 | Davis | Sept. 30, 1941 |
| 2,330,425 | Hilton | Sept. 28, 1943 |
| 2,580,546 | Hobson | Jan. 1, 1952 |
| 2,827,320 | Kane | Mar. 18, 1958 |